United States Patent [19]

Boucher

[11] Patent Number: 4,987,954

[45] Date of Patent: Jan. 29, 1991

[54] FUEL REACTOR

[76] Inventor: Robert J. Boucher, P.O. Box 985, Bonner, Mont. 59823

[21] Appl. No.: 492,972

[22] Filed: Mar. 13, 1990

Related U.S. Application Data

[62] Division of Ser. No. 276,884, Nov. 28, 1988, Pat. No. 4,922,839.

[51] Int. Cl.$^5$ ................................................ F28F 7/00
[52] U.S. Cl. ..................... 165/138; 110/234; 122/7 R; 122/13.1; 122/33
[58] Field of Search ............... 122/7 R, 13 R, 14, 16, 122/17, 136 R, 33, 15; 165/138, 185; 110/233, 234

[56] References Cited

U.S. PATENT DOCUMENTS 4,232,634  11/1980  Terrell et al. .............. 122/336 R X
4,413,590  11/1983  Landreau ..................... 122/14 X Primary Examiner—Edward G. Favors
Attorney, Agent, or Firm—James P. Hamley

[57] ABSTRACT

A fuel reactor particularly adopted for the efficient combustion of wood and wood-product fuels includes a core comprised of an inner fuel tube and an outer gas tube. Fuel is introduced into one end of the fuel tube and the combustion process is initiated. Perforations in the gas tube allow the combustion gas to progress down the fuel tube and combine with air in the gas tube. A high temperature is maintained on the gas tube to enhance the combustion process. In addition, high temperature-high pressure steam and air are introduced into the core to increase the reactivity rate of char products. The high temperature-high pressure steam is produced by a novel steam pump. The combustion gases are further processed through a gas dispersion chamber, including dispersion plates, and a gas expansion chamber. Heat is extracted from the combustion gases via a novel heat exchanger which includes a gas dispersion shelf, a radiating heat exchanger plate, a primary heat exchanger, and a condensing heat exchanger. A reheater chamber assures positive gas flow through the reactor and out a stack.

7 Claims, 12 Drawing Sheets

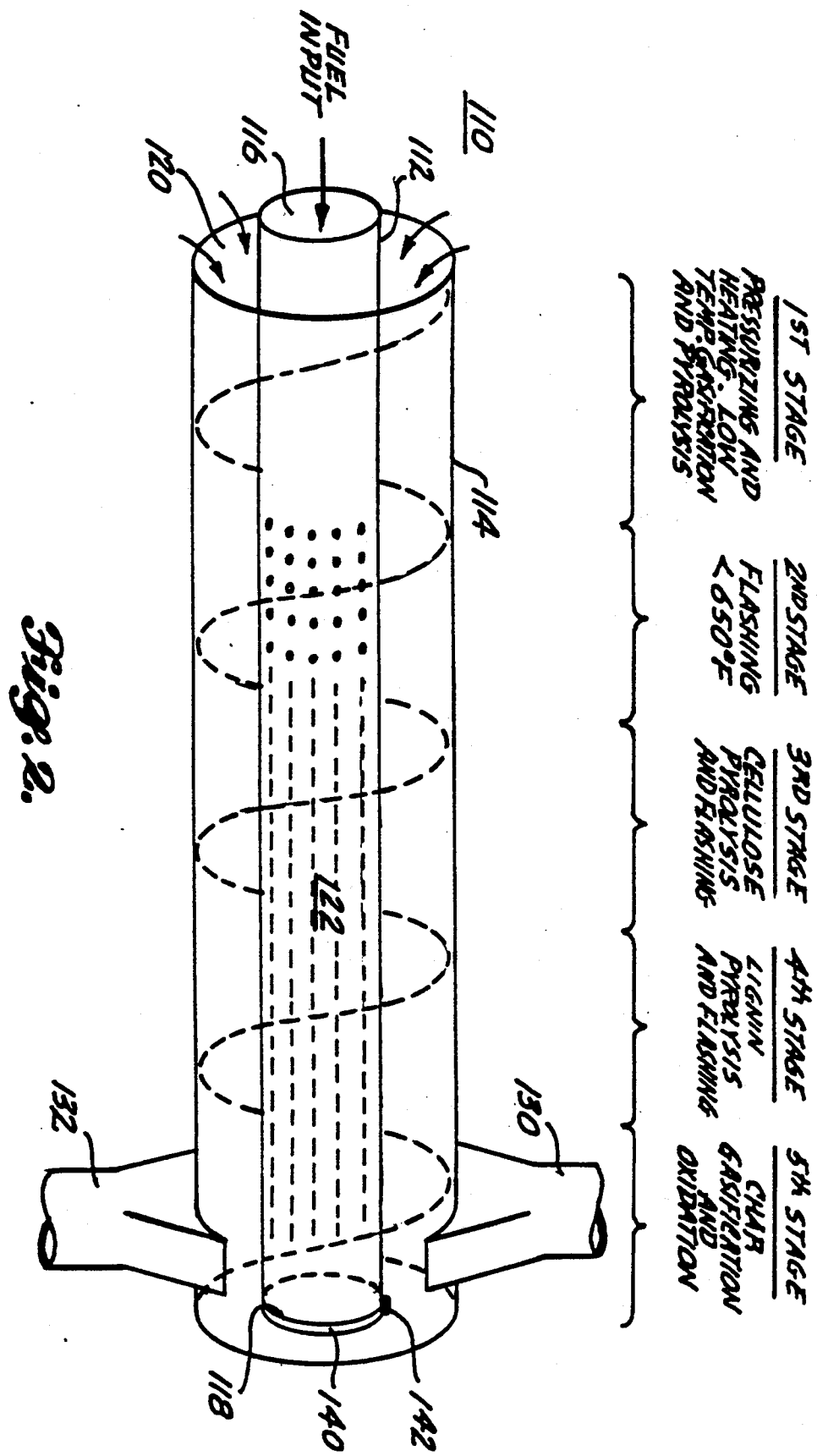

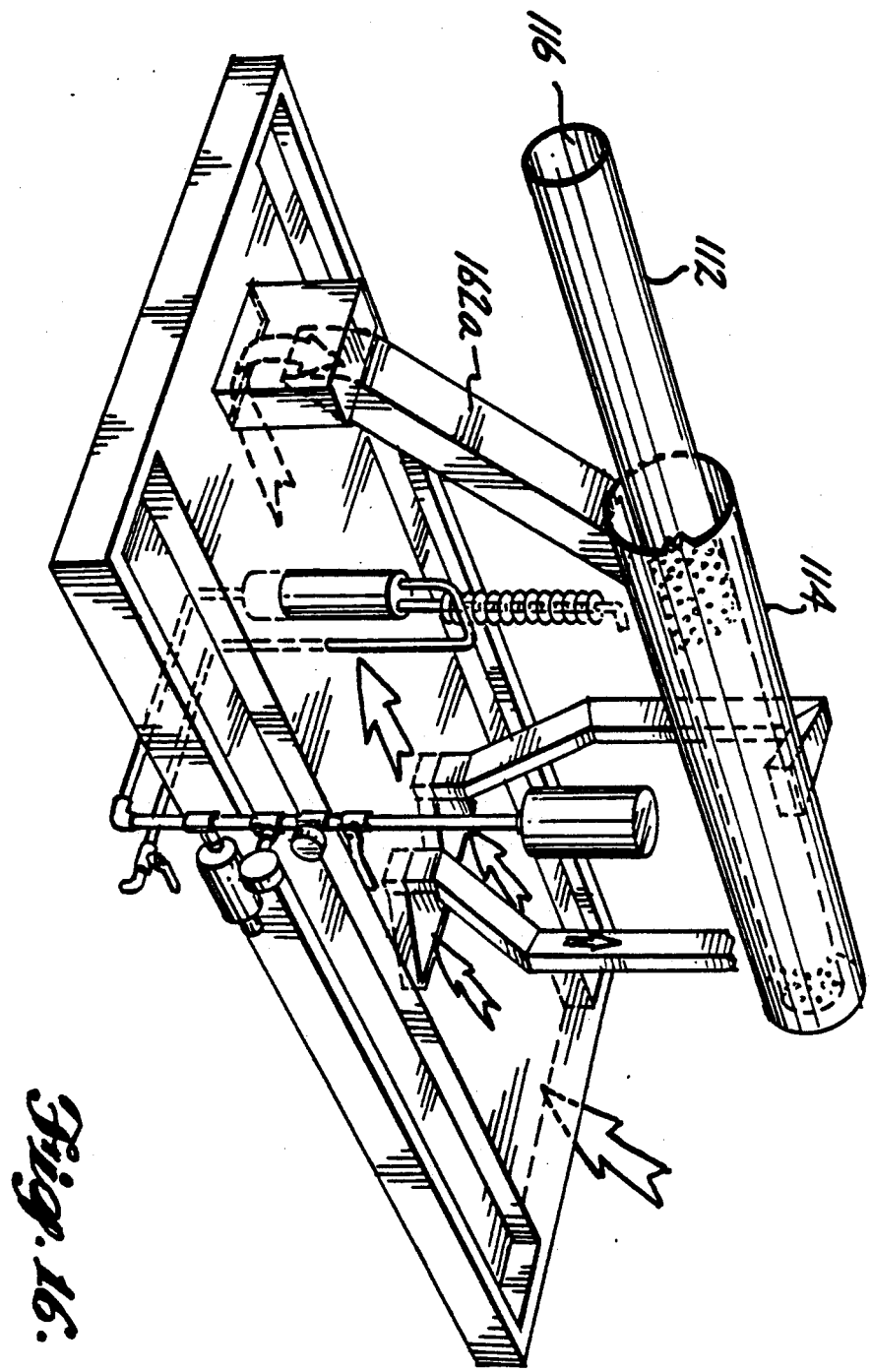

4,987,954

FUEL REACTOR

This application is a division of U.S. patent application. Ser. No. 07/276,884 filed Nov. 28, 1988 which issued May 8, 1990 as U.S. Pat. No. 4,922,839.

BACKGROUND OF THE INVENTION

The present invention is directed to a reactor for the combustion of fuels and, more particularly, to such reactor which exhibits a high efficiency with low pollution.

Using present techniques there are two basic modes for burning solid fuels—in a fuel bed and in suspension. There are several known methods of each mode: pile burning, moving bed, fluidized bed, tangential firing, cyclone firing, and so forth. There is a continuing demand for both efficiency and reduced pollution that present techniques can not satisfy.

As such, there is a long felt need in this art for a significant breakthrough in technology to produce combustion systems exhibiting high efficiency and minimal pollutants.

SUMMARY OF THE INVENTION

The present invention, therefore, is directed to a fuel reactor which employs a new basic combustion process to enhance combustion efficiency and reduce resulting pollutants.

It is a further object of this invention to provide an improved heat exchanger design to extract heat from the fuel reactor.

It is yet a further object of the invention to provide an improved steam pump design which finds particular application in converting condensate from the fuel reactor into high temperature—high pressure steam for injection into the reactor core.

Briefly, according to the invention, a fuel reactor comprises a core which includes a fuel tube and a gas tube. The fuel tube has a fuel input port at one end and is provided with a plurality of predeterminedly located and spaced gas vents over its extent distal from the fuel input port. The fuel tube is received within the gas tube, with the gas tube having an input port for receiving combustion air for the core. The core is contained within an appropriate containment which includes a system for routing combustion gases around at least a portion of the outer surface of the gas tube to maintain a gas tube temperature within a desired range. In this configuration, as fuel is introduced into the core, its constituents are successively pyrolyzed along the length of the reactor to thereby efficiently combust the fuel.

In a further aspect of the invention, and particularly wherein the fuel reactor is designed to combust wood or wood products, a steam and air injection system is employed to inject high pressure-high temperature steam with combustion air into the core at locations designed to combust particular constituents. In the example of wood in a fuel source, injection is provided towards the end of the core distal from the fuel input to gasified and oxidize char products.

In another aspect of the invention, the condensate produced by the fuel reactor is converted by a novel steam pump to high temperature-high pressure steam for use in the injection process.

Other features of the fuel reactor which are described in detail in the Specification and Claims include a gas dispersing chamber which is positioned at the end of the core distal from the fuel input port. The gas dispersion chamber comprises predeterminedly positioned dispersion shelfs which force gases and solids emitted from the core to be dispersed in the presence of the combustion gas to thereby promote completion of the oxidation process. In addition, a gas expansion chamber which encloses the core routes combustion gases which are emitted from the core to circulate about the core and thereby heat the gas tube. In the preferred embodiment, the gas expansion chamber includes a gas dispersion shelf which is positioned above the core and acts to distribute the combustion gas in substantially constant density across the top of the gas expansion chamber. In this way, the gas dispersion shelf provides a thermal barrier above the core for maintaining core temperature.

A novel heat exchanger is provided for extracting heat from the core. The heat exchanger includes a radiating heat exchanger plate which is positioned above the gas dispersion shelf for extracting heat therefrom and transferring the heat to a primary heat exchanger.

The disclosed gas dispersion shelf and the radiating heat exchanger plate include provided flow holes with the radiating heat exchanger plate positioned with respect to the gas dispersion shelf such that as the combustion gas flows through the gas dispersion shelf holes, it impinges on the lower surface of the radiating exchanger plate and moves laterally across the plate to the holes provided therein. The gas then flows to a primary heat exchanger which comprises a vessel for containing the heat exchanger medium. The vessel is positioned above the radiating heat exchanger plate includes gas flow tubes which extend through the vessel to allow combustion gas flow there through, thereby enhancing heat transfer. The heat exchanger is preferably provided with at least one heat pipe positioned between the vessel and the radiating heat exchanger plate such that combustion gases which pass through the holes in the plate flow around the heat pipe to the vessel gas flow tubes. The heat pipe carries the heat exchanger medium from at least two locations on the vessel to produce a flow in the heat pipe and thereby further enhance the transfer of heat from the combustion gases to the primary heat exchanger.

In a further aspect of the heat exchanger, condensing heat exchangers are provided which provide a plurality of vertical pipes joined to a manifold for providing the input exchanger medium to the vessel, with the vertical pipes being predeterminedly positioned opposite vertical faces of the fuel reactor.

A housing encloses the fuel reactor and the heat exchanger and forms a condensing chamber. The condensing chamber causes combustion gases which emerge from the top of the primary heat exchanger to be routed around the reactor, past the condensing heat exchanger through the reheater chamber and up to a stack provided in the upper surface of the housing.

A disclosed steam pump inputs a fluid and outputs a high temperature-high pressure steam. The steam pump includes a check valve which allows flow of the fluid into the steam pump but prevents reverse flow, and a pump vessel which includes an inlet at a first end for receiving the fluid and an outlet at a second end for outputting the high temperature-high pressure steam. Suitable heating of the system, such as an appropriate positioning of the steam pump within the fuel reactor, causes a predetermined heating of the second end of the vessel. A heat pipe mounts within the pump vessel such that one end thereof extends towards the vessel first end and the second end connects to the vessel outlet. In operation, as fluid flows into the vessel filling the vessel towards the vessel second end, the fluid is heated and converted into steam which forces fluid up the heat pipe where it is further heated, converted to steam and emerges from the pump vessel outlet.

In a further preferred aspect of the steam pump, a second heat pipe mounts external to the vessel with connections to both ends thereof to produce a flow of fluid to accelerate operation of the steam pump.

These and other aspects of the invention are set forth in greater detail herein below.

BRIEF DESCRIPTION OF THE DRAWINGS

FIG. 2 is a cross-sectional view of the preferred embodiment of the reactor core and illustrates the various combustion stages performed within the core;

FIG. 16 is an alternate embodiment of the fuel reactor wherein the fuel tube is exposed directly to the hot gases in the expansion chamber to enhance heat transfer to a solid fuel.

DETAILED DESCRIPTION

Theory of Operation

Figure 1:
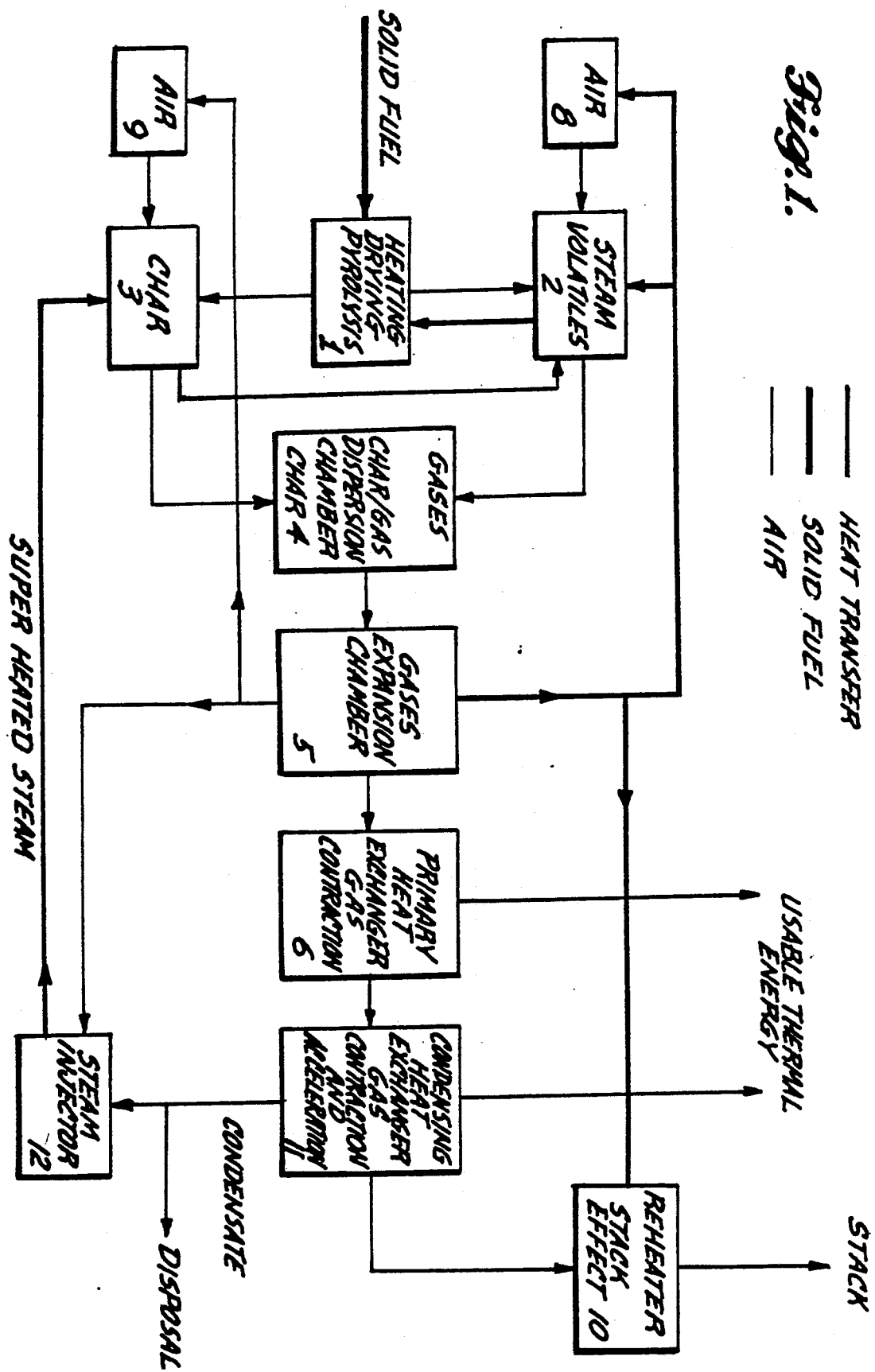
FIG. 1 is a schematic diagram illustrating operation of the fuel reactor with FIG. 1A illustrating the manner by which a self-induced draft is produced.

The invention described herein is a fuel chemical reactor since the described system can be used for combustion, gasification, and possibly as a fuel cell using most any fuel, —particularly solid fuels. It is particularly suited for any solid fuel with a high percentage of volatiles such as wood, municipal waste, biomass, high volatiles coal, sewage and chemical waste sludge. While the reactor described and claimed herein is suitable for burning any of a large number of fuels, the preferred embodiment described is intended for use in combusting wood in the form of wood chips or other wood products. It should be understood that the basic process disclosed herein can be used to combust other fuels. The chemical reactions are essentially the same, with modifications for air, temperature, time, steam, and catalyst depending upon the desired final products.

Prior to the present invention, there have been two basic modes for burning solid fuels—in a fuel bed and in suspension. Several known methods practice each mode, namely, pile burning, moving bed, fluidized beds, tangential firing, cyclone firing, and so forth. The fuel reactor described herein does not fit either of these modes in that the fuel is not on a bed or in suspension and the raw solid fuel is not introduced with combustion air. In view of the fact that the process described herein is totally different than the two previously practiced modes, the present invention should be considered a third basic mode for fuel (particularly solid fuel) combustion.

Wood combustion is a complex process involving a variety of volatile products and char. The combustion reactions are reducing (endothermic) and oxidation (exothermic), producing very simple to very complex molecules. The products vary from highly reactive to thermally stable and anti-oxidant products. There are cyclic transitions, free radical formation, intermediate and termination reactions, catalytic auto-catalytic, water-shift, antioxident and reforming reactions. All of these reactions depend upon specific conditions of temperature, time, turbulence, water content, fuel/air ratio and available reactants species.

In existing reactors pyrolysis is not a selective operation and results in a broad spectrum of products. All of the above reactions occur simultaneously with no control of any specific reaction. In this haphazard combustion process, the result is incomplete combustion, formation of complex molecules, long residence time, inordinate excess air, particulate pollution and large and expensive reactors. This has resulted in inefficient and polluting systems.

It is well understood that there are four basic stages of wood combustion: (1) heating and drying, (2) solid pyrolysis, (3) gas pyrolysis and oxidation, and (4) char oxidation. Not well known are the important substages or stratification in each basic stage and the significance of each substage to the overall combustion reactions. To design a significantly improved reactor, these substages need to be identified and controlled.

Stage 1

Heating and drying has been generally regarded as an undesirable and energy consuming stage. However, under proper conditions this can be the most useful stage in setting up the conditions for the remainder of the process. Water content is actually very functional and useful, not a disadvantage. By heating and pressurizing the wet fuel and preventing water from escaping, the water can be used to degrade the simpler molecules and weaken the bonds of more complex molecules. By heating and not drying but pressurizing, the first stage is an autocatalytic stage, pyrolizing the volatiles at a lower temperature.

Stage 2

Solid pyrolysis can be done in four substages because the volatiles decompose in four temperature zones. By statifying these substages in combusting the products individually, the combustion reaction rate can be greatly increased. Wood consists of hemicellulose A and B it degrades between 440° F.–600° F. Cellulose degrades between 620 °F.–710° F. and lignin between 500° F. and 930° F. It is quite advantageous to pyrolize and combust these constituents separately.

The three cellulose (holocellulose) are made up of the same basic carbohydrate $C_6H_{12}O_6$ (monosaccharide). These molecules are joined to form cellulose by losing one water molecule and joined with one oxygen atom to form $C_6H_{10}O_5$. The differences between the cellulose is the degree of polymerization (DP) or number of molecules joined. Hemicellulose B is the simplest and most volatile. It has a DP of less than 10 and is the only cellulose with chain branching. Hemicellulose A has a DP of 70–200. Cellulose has a DP of 2500–10000+. As the holocellulose molecular complexity increases, thermaldegragation occurs at increasing temperature.

Lignin consists of aromatic phenolics, which are relatively thermally stable molecules and decompose at the highest temperature. This is the fourth substage of solid pyrolysis. These products are the inhibitors in wood combustion chemical reactions in that they interrupt or terminate the oxidative chain reactions of the hydrocarbon molecules. Phenols and aromatic hydrocarbons are antioxidants and in wood combustion these products prevent or interfere with the oxidation reactions by scavenging free radicals and stopping kinetic chain reactions, thus allowing molecules to reform to more stable and complex aromatic molecules. Phenols do not ignite until they are above 1320° F. The polycyclic aromatics are formed between 1475°F.–1575° F.

Lignin is pyrolyzed below 1000° F. Therefore, to prevent the adverse effect of the lignin products, they must be taken from 1000° F. to 1800° F. very rapidly—above the ceiling temperature of the polycyclic aromatics, and at the same time mixed with oxygen.

In this stratified pyrolysis process, the antioxidants from the lignin can not interfere with the chemical reactions of the holocellulose. In existing systems, the conditions that favor antioxidant reactions and polycyclic aromatic formation are present. This process must then be reversed by thermal degrading the products and then oxidizing. This process requires excessive residence time, turbulence and excess air.

Stage 3

This is the gas pyrolysis and oxidation stage. A diversity of chemicals arise out of secondary reactions. There is a tendency for the combustion rate to increase as the combustion proceeds. This tendency is called autocatalysis. There are two autocatalytic reactions—chain branching and temperature increase. The combustion reaction rate is an exponential reaction of temperature and doubles with each chain branching. When the rate at which heat is liberated in the reaction is greater than the rate which heat is dissipated, the result is a thermal explosion. When the rate of chain branching equals or exceeds the rate of chain termination, the result is a branch chain explosion. Because the volatiles in wood are pyrolyzed over a stratified temperature range, the two autocatalytic reactions can be favored if a constant thermal energy source is available to provide the energy for the endothermic reactions and to maintain the free radical formation (initiation and propagation). Each chain branching creates two free-radicals, which is propagation. Oxygen is a scavenger of free-radicals which is a determination reaction and is highly exothermic. The holocellulose aliphatic straight chain and branched chain structure favor chain branching and thermal reactions. With the oxygen+radical reaction proceeding uninterrupted, the temperature rises rapidly thus creating more chain branching. This autocatalytic process causes a very fast combustion rate.

The lignin volatiles are phenols and aromatics which are radical scavengers or chain branching terminators and, therefore, decrease the combustion reaction rate. The antioxidants from lignin need to be separated from the holocellulose reactants until the holocellulose have been oxidized. The phenols oxidize above 1375° F. and the aromatics reform to polycyclic aromatics between 1475° F.–1575° F. and cause cellulose to reform to polycyclic products. Therefore, these products must be taken to 1800° F. rapidly, well above their ceiling temperature, with plenty of oxygen to ensure fast reduction and combustion rate with few intermediate reactions.

Stage 4

The char gasification and oxidation process. Char reactivity rate is very slow compared to the volatiles because of char's solid carbon form and porosity. One cubic inch of char can have up to 125,000 square feet of surface area. The char reactivity rate can be increased mechanically and chemically. By mechanically grating and breaking the char and with erosion using high velocity, the particle size is reduced and the exposed surface area is increased. The char reactivity rate can be increased chemically by holding the char above 1500° F. long enough to be completely devolatized, creating maximum free radical sites; and, by blasting the char with high velocity super-heated steam and oxygen (air) such that the pressure causes the gases to penetrate the char's pores, increasing the reacting surface area and available radical sites. Char can be gasified very rapidly with high pressure, super heated steam resulting in gases which can be easily oxidized. The steam/char reaction is endothermic and the oxygen (air)/char reaction is exothermic. With a combination of steam and oxygen the char temperature can be closely controlled. The char can be used to reduce the final excess air by passing the volatile combustion gases, with excess air, over a char bed where the air can react with the carbon.

PREFERRED EMBODIMENT

FIG. 1 is a schematic diagram illustrating the principle functional components of the fuel reactor. Specifically, solid fuel is heated with water and volatiles being vaporized in stages at block 1. Steam and volatiles flow to block 2 and char flows to block 3. Air from block 8 is combined with the volatiles at block 2 causing combustion. Heat is transferred to block 1 and hot gases flow to block 4. Air from block 9 and steam from block 1 combine with char at block 3. The hot gases from block 3 flow to block 2 and the char flows to block 4. Hot gases and excess air from block 4 flow to block 5.

Heat is transferred from block 5 to blocks 8 and 9 to heat combustion air; 1—to dry and pyrolize the solid fuel; 2—to pyrolize volatiles; 10—to reheat cold, dried combustion gases; 12—to super heat condensate for char injection. The thermal energy transferred from 5 to 1, 2, 8, 9, 12 is returned to 5. Hot gases flow from block 5 to block 6. Heat is extracted from the hot combustion gases at block 6 for usable energy. Cooled gases flow from block 6 to block 11. Heat is extracted at block 11 for usable energy, the dried gases flow to block 10, the condensate flows to block 12 or disposal. The dried gases are heated at block 10 and flow out the stack. At block 12 the condensate is turned to super heated steam and injected into block 3.

Figure 1A:
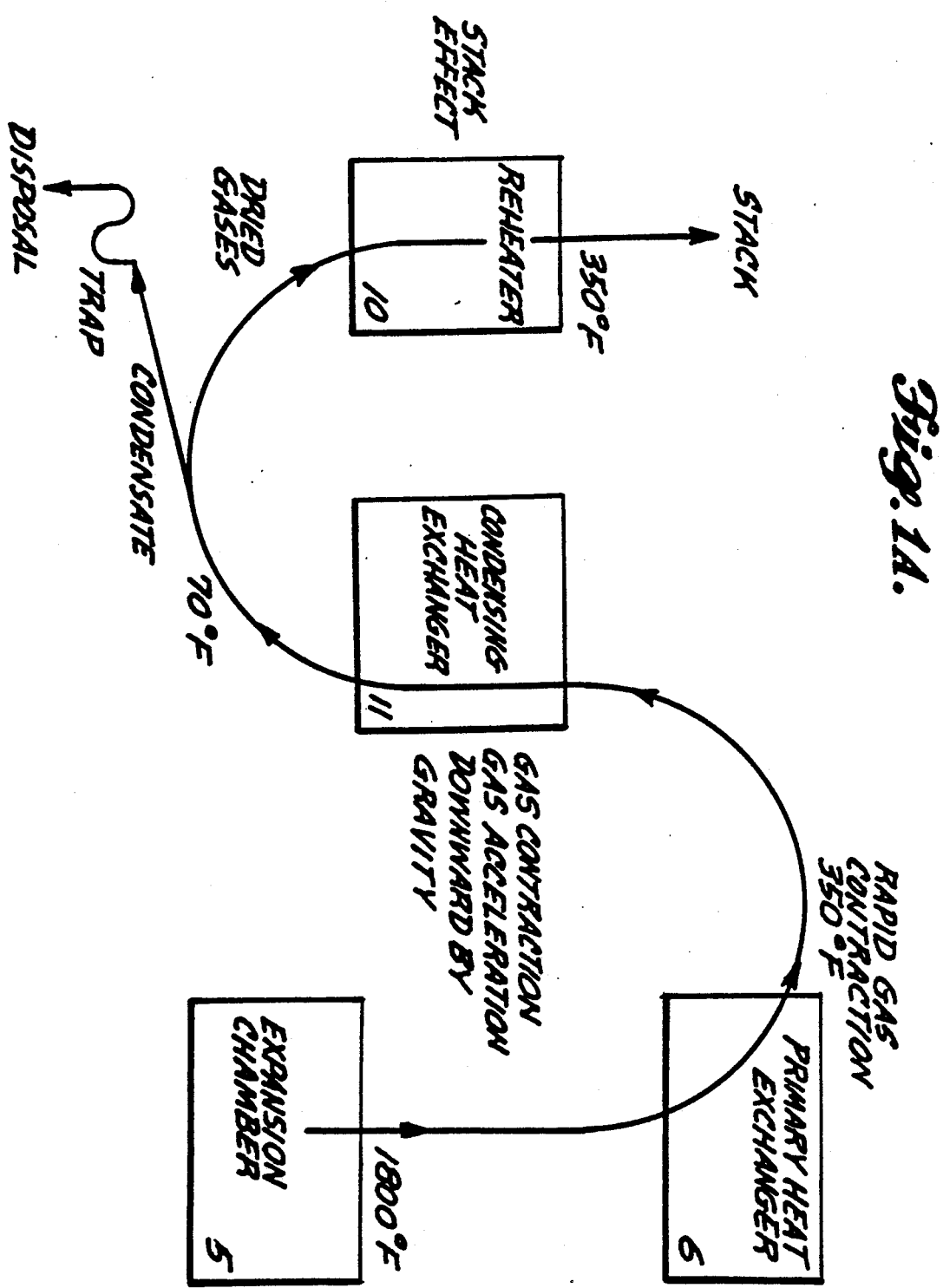

The low pressure created at blocks 6 and 11 and the flow acceleration at blocks 10, 11 cause the gas flow at blocks 8, 9, 1, 2, 3, 4, 5, as is illustrated in FIG. 1A.

FIG. 2 is a cross-sectional view of the reactor core, indicated generally at 110 which forms the heart of the fuel reactor. The core is comprised of a fuel tube 112 and a gas tube 114. As shown, the two tubes 112, 114 are cylindrical, with the fuel tube 112 being received within, and positioned on a common longitudinal axis with gas tube 114.

The fuel tube has a fuel input port 116 and an output port 118. The gas tube 114 receives, in a manner described in greater detail with respect to FIGS. 3 and 4, input preheated air at an inlet 114.

The fuel tube 112 is a solid fuel reactor where the solid fuel is devolatilized and the char gasified and/or oxidized in stages—operating off the vapor pressure of the volatiles. The four constituents of the wood-hemicellulose A and B, cellulose and lignin pyrolyze in four temperature zones. The complexity of the combustion produced products vary from simple molecules to complex molecule in stages. The solid fuel reactor takes advantage of this phenomenon thereby allowing a stratified pyrolysis operation and resulting in a narrow spectrum of products in each stage. The stages are: (1) pressurizing and heating, (2) flashing the hemicelluloses and steam products, (3) cellulose pyrolysis and flashing, (4) Lignin pyrolysis and flashing, and (5) char gasification/oxidation with steam and air.

In the first stage, fuel is fed into the fuel tube 112 at input 116 and is heated to approximately 400° with increased pressure. The fuel moisture may be as high as 50% There is oxygen in the fuel and air in and around the fuel. Under the above conditions, low temperature gasification and pyrolysis occurs forming oxygenated products (ethanol and methanol) and other simple products from the hemicellulose.

This is a cyclic transition pyrolytic process wherein the compounds are broken down but no radicals are formed and no oxidation occurs. This process is highly endothermic.

The moisture in the fuel aids the first stage process. It increases the thermal conductivity of the fuel but at the same time puts a ceiling on the temperature. The bound water has bonds with the hydroxyl functional group in the fuel with free water in the structural voids. As the fuel moves through stage 1, the water at the wall of fuel tube 112 is vaporized and diffuses to the center of the fuel. The liquid migrates to the surface by diffusion, capillary action and attaching from one hydroxyl group to the next. As the temperature increases, this action causes low temperature pyrolysis and at the same time oxidation is avoided. As the fuel is heated to 400° F., considerable vapor pressure is created from the volatiles and steam.

The second stage makes use of a plurality of gas vent holes 122 which are provided in the fuel tube 112. There is a large pressure gradient between the fuel tube 112 and the gas tube 114. This causes a flashing affect through the gas vent holes 122 resulting in a high vapor flow velocity.

The steam and volatiles flow through the fuel fiber cells, voids (lumens) tracheid wall pits and cell walls where they are thin or crushed. During this process the fuel is mechanically eroded and chemically degraded or pyrolized. The flashing process has a cooling effect on the fuel such that even though the fuel has moved into a much hotter section of the reactor, it gains little heat. It is important to keep the fuel below 650° F. until the hemicellulose, air, oxygen and 70% of the cellulose have been vented out of the solid fuel. The oxygen and air can oxidize hydrogen and carbon causing very high localized temperature which can result in the formation of phenols, aromatics or free radicals. At this stage, antioxidants, thermally stable molecules, and free radicals need to be avoided.

The flashing causes the gases to have a high radial velocity which carries them to the inner surface of the gas tube 114. In a manner described more fully below, the gas tube is maintained at a high temperature (approximately 1800° F.) whereby upon impinging on this hot surface, the combustion gases catalytically and thermally crack thereby exciting the molecules, creating free radicals and starting the combustion kinetic chain reactions as the gases flow down the core 110. Maximum volume of air is mixed with the gases at this point producing a low fuel/air ratio a fuel lean mixture.

Hemicellulose decomposes at around 440° F.–600° F., with cellulose decomposing at 620° F.–710° F. and lignin at 500° F.–930° F. Tests have shown that vapor pressure causes an autocatalytic effect on cellulose, substantially lowering the decomposition temperature. By the time the solid fuel temperature exceeds 650° F., all the steam, hemicellulose and 70% of the cellulose have been extracted from the solid fuel. As the solid fuel increases from 650° F. to 1200° F., the remainder of the cellulose, lignin and a part of the char is pyrolyzed. The vapor pressure of these products cause them to vent out of the solid fuel fairly fast, leaving activated char in the fuel tube 112. The aromatic phenolics from the lignin are antioxidants. These are mixed with the combustion gases of the previous products, but they do not interfere with the oxidation reactions because the combustion reaction is completed. the gases is at 1800° F.—well above the ceiling temperatures of the phenols (1375° F.) and the polycyclic aromatics (1575° F.). Also, there is plenty of excess air mixed with the hot gases.

A large pressure gradient forms radially in the core causing the volatiles to exit. There is a small almost negligible radial temperature gradient because the products venting from the center cool the outer region. Therefore, the products evolving are radially uniform.

Hot air is injected into the fuel tube 112 at a predetermined distance down the core by means of a pair of injectors 130, 132. In the preferred embodiment of the invention designed to combust wood products, the injectors are positioned approximately ¾ of the distance down the core from the fuel input 116 end. The injectors 130, 132 introduce hot air into the remaining activated char thereby creating a very hot zone (1800°+)

These gases vent to the gas tube 114. In a manner described more fully herein below, steam can also be vented into the char with the air or blasted at high velocity into the char with a suitable injector. This process greatly increases the char reactivity and BTU output of the reactor. The vent holes 122 along the length of the fuel tube 112 cause a grating action on the char such that small char particles are carried in the gas stream. This consumes 15%-25% of the char. The oxidizing char particles aid in heating the gas stream, providing energy for endothermic reactions of the gases. These particles serve as a catalyst in that they act like miniature spark plugs and contact surface area for the gases.

At the end of the fuel tube 112 is mounted an end cap 140 which is hinged via a hinge 142. The end cap 140 and hinge 142 are designed such that the gases cannot exit the end of the tube but must vent through the gas vent holes 122 to the gas tube 114. Any unconsumed char, however, is pushed out the door into a char/gas chamber, which is described more fully hereafter.

The secondary pyrolysis and oxidation reactions occur in the gas tube 114 as the gases are produced and vented from the fuel tube 112. The outer surface of the gas tube 114 is held within a predetermined temperature range of 1800° F. to 2000° F. by the final combustion gases which flow around it. The external heat density is great enough that the thermal energy extracted internally does not noticeably lower the temperature of the gas tube 114. This heat source provides energy to the solid fuel and gas reactors by radiation and conduction and provides a hot catalytic surface to create free-radicals.

The gases that vent to the gas tube are stratified, going from simple fractions and progressing to molecules increasing complexity. Hence the reduction and oxidation reactions proceed from relatively simple or short kinetic chain reactions to long complex reactions.

This allows the easily obtained thermal energy from the simple products to be produced rapidly and made available for the endothermic reactions later and also provides thermal energy for the pyrolysis of the solid fuel. Also, this prevents the antioxidants produced from the lignin from interfering with combustion chain reactions of the holocellulose products. By the time the phenols and aromatics are vented to the gas stream, the gas stream has a very high heat density, floating catalysts and plenty of excess air. These conditions cause the complex and thermally stable molecules to reduce and follow the combustion kinetic chain reaction they are prevented from reforming to the polycyclic aromatic molecules. There is a temperature gradient from 400° F. at the fuel input end 116 of the core to 1800° F. at the char end of the gas tube 120.

Figure 3:
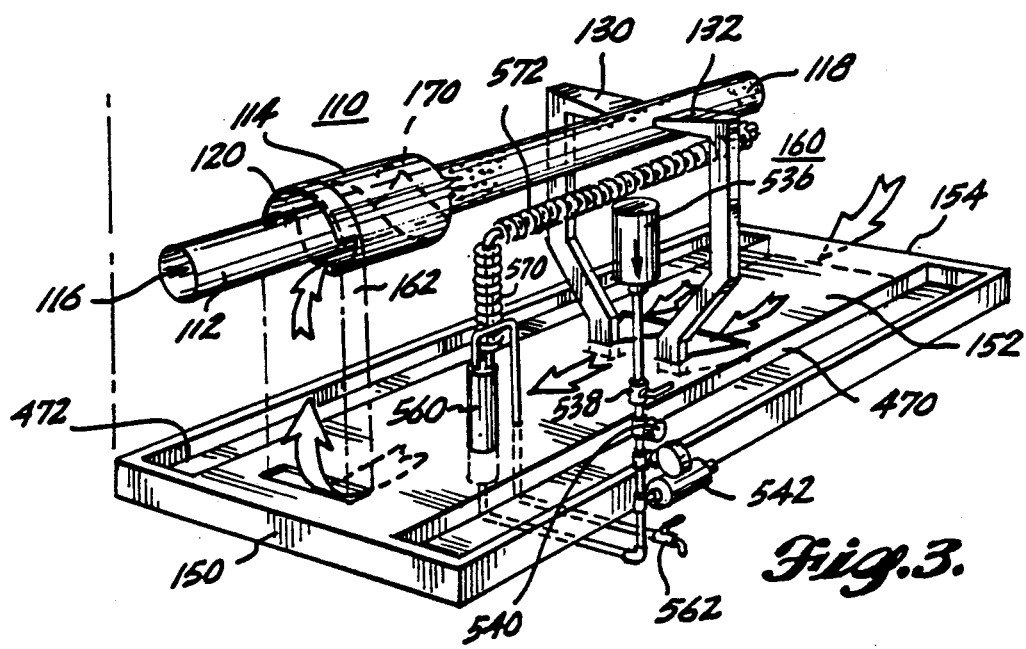
FIG. 3 is a partial assembly, perspective view of the fuel reactor illustrating the core, injection system and combustion air delivery system.

The manner by which preheated air enters the core is best illustrated in the perspective views of FIGS. 2 and 3. Shown is the core 110 comprising the fuel tube 112 and the gas tube 114 having a fuel input 116, an air inlet 120 and an outlet 118. A pair of injection nozzles 130, 132 supply preheated air and steam (described hereafter) at a predetermined location in the core.

The core is suspended above a base portion 150 into which is formed an air duct 152 which receives ambient air through a provided rear ambient air input port 154. As shown by the arrows, ambient air enters the air input 154 travelling through the duct 152 which, since it is enclosed within the outer reactor shell 160, results in preheating of the input air. Via cutouts, the air is divided via control vanes (not shown) to either the injection system, indicated generally at 160 or, via a duct and support strut 162, as input air to the core 110. The preheated air enters the gas tube 114 at the feeder end such that the fuel/air ratio has a lean to rich gradient and the fuel and air are in a pre-mixed conditioned. All stoichiometric and excess air is introduced immediately to the gases such that plenty of excess air is available for the full length of the gas tube 114. The excess air is consumed by the char on the char/dispersion shelves (see FIG. 5). Oxygen is a scavenger for the free-radicals having a high affinity for them. In this process, the volatiles are never in an atmosphere without excess oxygen which thereby allows very fast chain reactions. Char oxidation is a short and fast reaction by having a fixed char bed and causing the combustion gases to flow over it, the char can consume the last of the oxygen. This allows very little excess air. Because of the high temperature produced in the reactor, the flammability limits of the fuel are not a factor.

The design of the core 110 produces a maximum turbulence in the gas tube 114 resulting from forces in three directions. The gas pressure in the fuel tube 112 creates a radial force. The gas tube 114 is provided on its inner surface with a spiral vane 170 which creates a tangential force. Finally, the tubes 112, 114 create a longitudinal force. These forces create a maximum mixing of the hot combustion gases, raw gases and air with maximum contact of the surfaces of the fuel tube 112 and gas tube 114. The gases absorb heat from the gas tube 114 and lose heat to the fuel tube 112.

Figure 5:
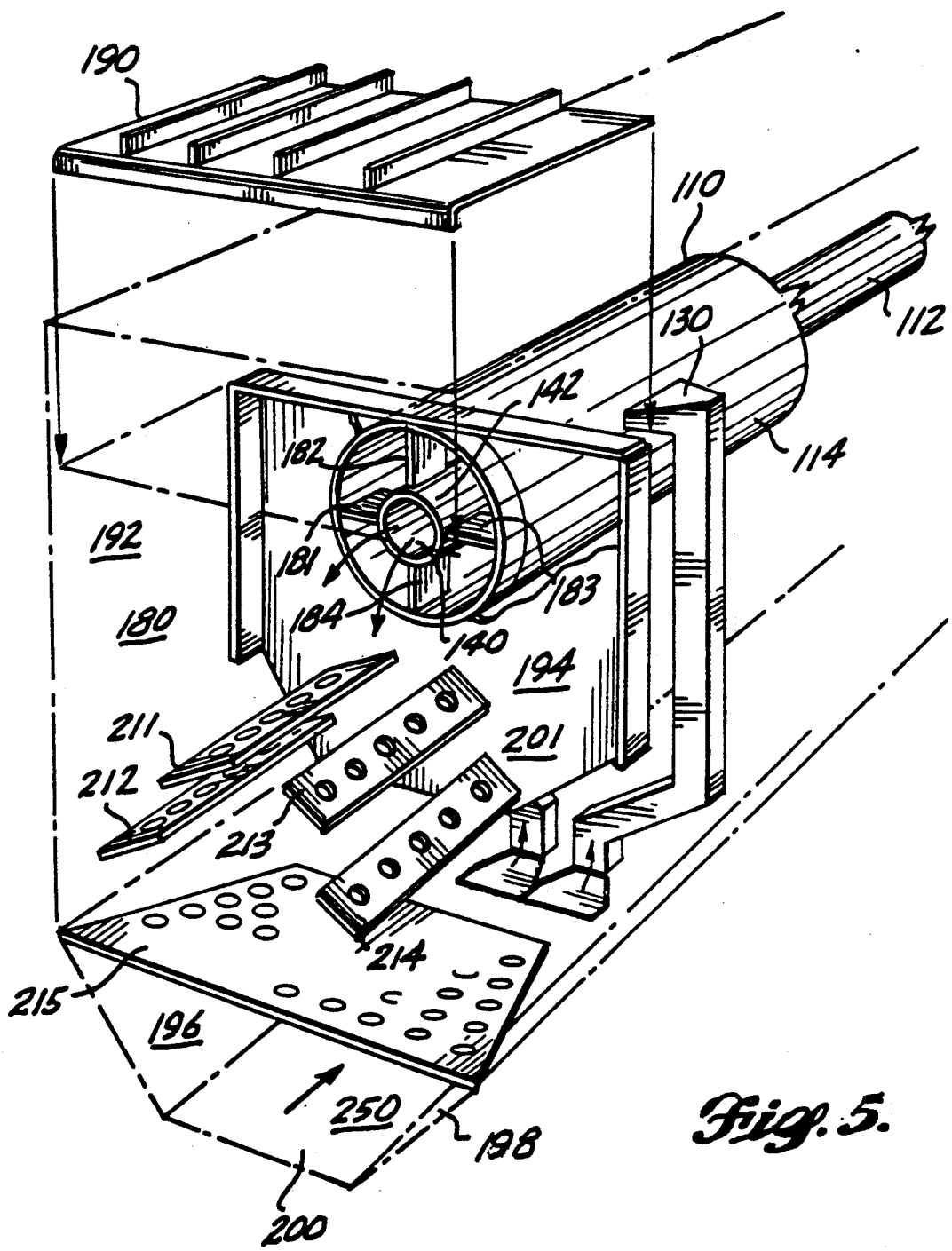
FIG. 5 is a cross-sectional view of the exit end of the core and illustrates the gas dispersion chamber and gas dispersion plates provided therein.

FIG. 5 illustrates the construction of the char/gas chamber, indicated at 180. Shown is the exit end of the core 110 comprised of the fuel tube 112 and the gas tube 114. Also shown is one injection nozzle 130. At the exit end of the core 110, four radial struts 181-184 suspend the fuel tube 112 within the gas tube 114. The fuel tube 112 is provided with an end cap 140 which is hinge via hinged 142. Thus, hot combustion gases from within the gas tube 114, and solid char which escapes through the end cap 140 enter the char gas chamber 180. The char gas chamber is formed by an upper plate 190, opposing vertical side walls 192, 194, tapered lower walls 196, 198 and a floor 200. A firewall 201 and an end wall (not shown) completes the outer dimensions of the char/gas chamber 180.

The combustion gases enter the char/gas chamber at 1800° F.+, ready for oxidation or gas manufacturing. The char gas chamber 180 causes the char and gas flow to change directions and directs the char to be positioned by gravity such that the gases and excess air will flow over, around and through the char to degrade and oxidize it.

The gas stream exits the gas tube 114 and impinges on the end wall (not shown) which acts as a catalytic plate and stops horizontal gas flow. This creates turbulence and allows ash to fall out and also allows the direction of flow to be changed at 90° to a downward direction. A plurality of predeterminedly relocated char/gas dispersion shelfs 211-215 are positioned below the exit of core 110 in the char/gas chamber 180. The function of the char/gas dispersion shelfs 211-215 is to cause the char and gases to be spread out thereby maximizing the char/gas contact with combustion gases to thereby complete the oxidation or gas manufacturing process. The gas dispersion shelfs 211-215 serve as a catalyst by holding a very high temperature and providing an extensive contact surface area. The gas dispersion shelfs 211–215 can be constructed of coarse materials and/or be provided with dispersion holes as shown.

After passing through the gas/char chamber 180, the gas enters a formed gas expansion chamber 250, shown in greater detail in FIG. 3. The gas, upon exiting the char/gas chamber, again reverses direction 90° and begins flowing back along the longitudinal length of the reactor towards the air and fuel inlets. This flow takes the gases around the core 110 thereby providing the required heating of the gas tube 114 as described above. Also, the gas expansion chamber causes the gas stream velocity to slow down, expand and create further mixing. Also, as the combustion gases are forced in an upward flow back around the core 110, ash particles settle out of the gases and collect in ash containers (not shown). Since the core is centered at the upper section of the gas expansion chamber 250, hot gases heat the gas tube 114 to approximately 1800° F., thereby providing thermal energy for the endothermic reactions taking place therein. The heat density in the gas expansion chamber 250 is sufficient such that heat transferred to the gas tube 114 and fuel tube 112 endothermic reactions are supplied without any significant reduction in the temperature of the gas tube 114. All the thermal energy given up in the gas expansion chamber is returned, creating energy transfer equilibrium.

Figure 4:
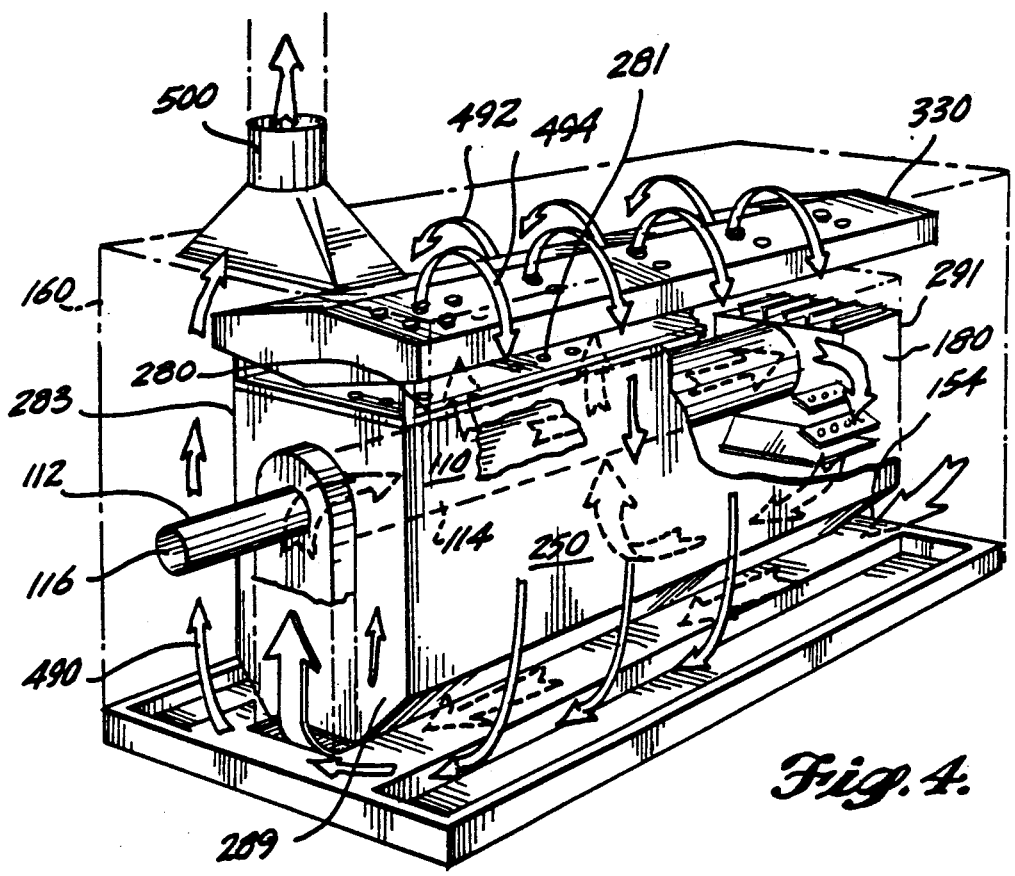
FIG. 4 is a perspective view of the reactor illustrating flow of combustion gases with a partial cutaway view of the gas dispersion chamber and a partial view of the heat exchanger.

Referring to FIG. 4, positioned above the core 110 is a thick perforated and insulating combustion gas dispersion shelf 280. Shelf 280 (which, in the preferred embodiment, is made of ceramic and is between one and two inches thick) serves to spread out the combustion gases at an equal density across the top of the gas expansion chamber 250. Also, shelf 280 positions the gases to be transmitted to the heat exchanger (described herein and below) radiator plate and provide a radiant or thermal barrier above the core 110 such that the core does not lose energy to the heat exchanger. The combustion gas dispersion shelf 280 also acts as a last stage combustion zone and ash removeable site. A portion of the combustion gas stream impinges on the lower surface of the gas dispersion shelf 280 allowing time, turbulence and catalytic action to oxidize gas molecules and stop the upward moving ash. As the combustion gases flow through holes, such as hole 281 in shell 280, the gases are brought closer together thereby increasing the chances for oxygen and gas to contact and resulting in oxidation.

The central reactor, therefore, which is indicated generally at 283 (FIGS. 4 and 8) includes vertically standing endwall 289, 291.

Figure 7:
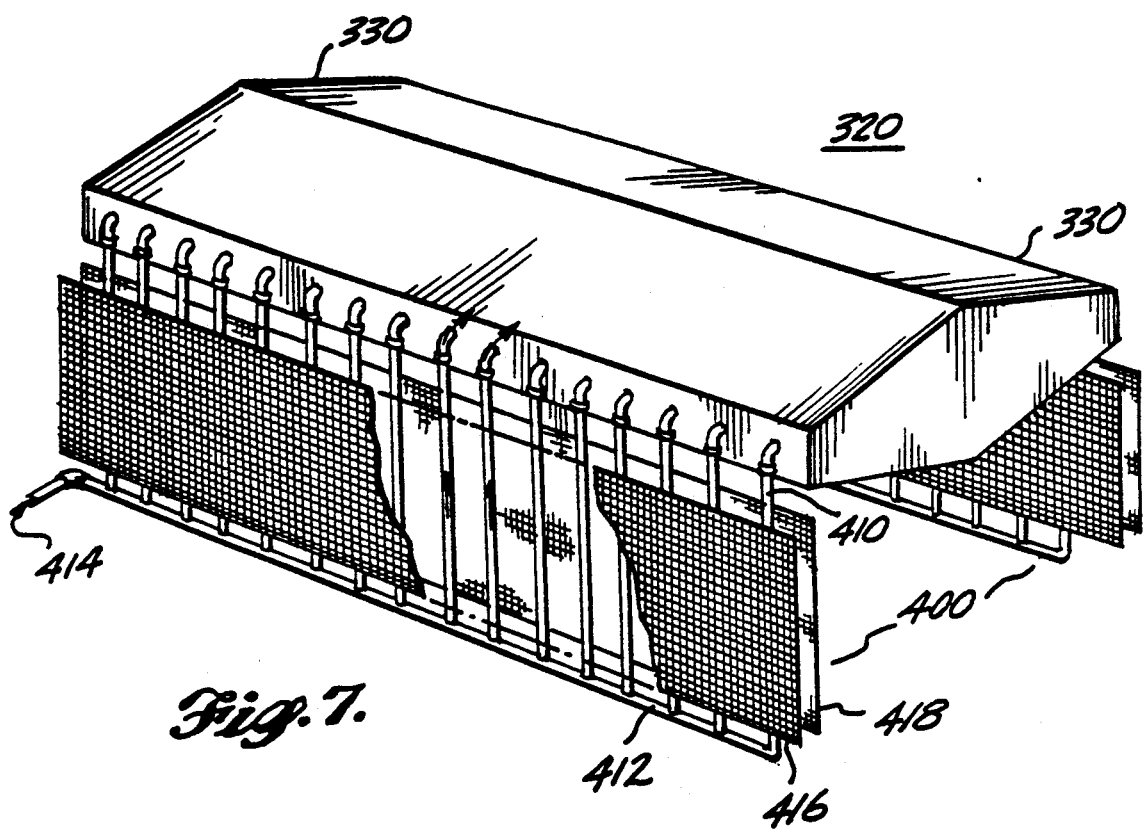
FIG. 7 is a perspective view illustrating the arrangement of the condensing heat exchanger with a condensing wire mesh wall.
Figure 6:
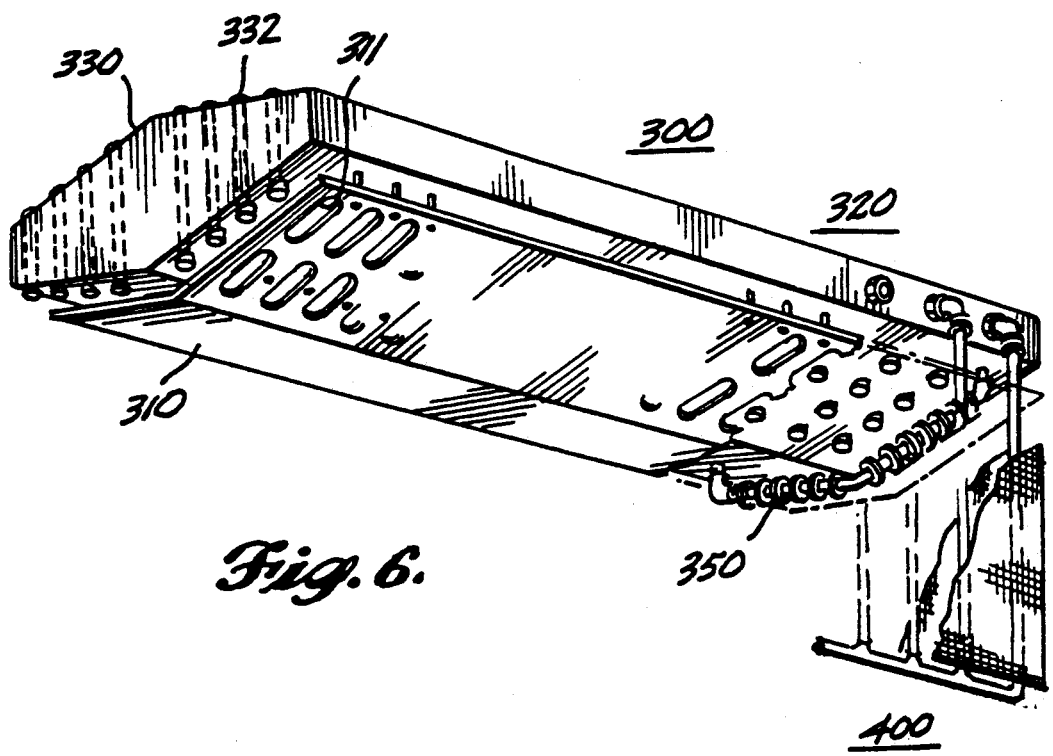
FIG. 6 is a perspective view illustrating the preferred construction of the heat exchanger including the radiating heat exchanger plate and the primary heat exchanger.

FIG. 6 and 7 illustrate the construction of the preferred heat exchanger, indicated generally at 300, used to extract heat produced by the fuel reactor.

Located above the gas dispersion shelf 280 (FIG. 4) is a perforated, radiating heat exchanger plate 310. The radiating heat exchanger plate 310 is a black body with provided holes, such as hole 311, located such that they stagger with the holes of the gas dispersion shelf (e.g., hole 281) whereby the hot combustion gases flow through the gas dispersion shelf holes and impinge upon the bottom of the radiating heat exchanger plate 310 such that they are forced to move laterally to the next available hole (e.g., hole 311) in the radiator plate 310. In this way, maximum heat is transferred from the gases to the radiating heat exchanger plate 310.

The radiating heat exchanger plate 310 extracts heat from the hot combustion gases by conduction and radiates the heat to the primary heat exchanger, indicated generally at 320, directly above plate 310. Since radiant heat transfer is to the fourth power of the temperature difference of the heat exchanger plate 310 and the primary heat exchanger 320, a significant amount of energy is transferred.

The primary heat exchanger 320 cools the combustion gases from approximately 1800° F. to 350° F. thereby converting 80% of the thermal energy. This conversion can be accomplished either air to gas or water to gas in a suitable exchanger. The preferred embodiment, set forth in FIGS. 4, 6, and 7, utilizes a water-to-gas system employing a heat exchanger vessel 330. The vessel 330, designed to contain the exchanger exchange medium, such as water, has a generally diamond shape cross-section and a longitudinal length corresponding to the length of the fuel reactor. The vessel 330 is provided with a plurality of vertically extending flow tubes such as a flow tube 332, which allow flow of the combustion gases through the vessel 330 to thereby maximize heat transfer.

Located between the bottom of the vessel 330 and the upper surface of the radiating heat exchanger plate 310 are a plurality of heat pipe steam generators, one of which is illustrated at 350. The heat pipe steam generator 350 is a tube provided with radially extending heat vents. The tube connects at predetermined, different locations in the vessel 330 thereby allowing fluid within the vessel to enter the heat pipe 350. While the preferred embodiment illustrated in FIG. 6 depicts the heat pipe having a pair of connections to the vessel, it should be understood that numerous other configurations are possible, such as a system wherein fluid is supplied at the center of the pipe and moves in opposite directions to predetermined position points in the vessel 330.

Spiral grooves (not shown) are provided on the inside of each heat pipe 350 to yield maximum surface area and a fine mesh screen (not shown) provides the system for fluid within the heat pipe 350 to migrate to dry surfaces and to provide surface tension until the fluid reaches the nucleate boiling point. Each fluid droplet at each hole transfers heat with the latent heat of vaporization. If uneven heating occurs along the heat pipe 350, each point will hold the droplet until the heat of vaporization is reached. This system allows the same efficient heat transfer at variable BTU output and at the same time prevents the laidenfrost point where an insulating film of gas is formed on the inner surface of the heat pipe 350. The heat pipe steam generator 350 can transfer heat and maintain liquid on the inside surface thereof at the velocity of the speed of sound. Thus, the action of each of the heat pipes, such as heat pipe 350, is to create a flow within the vessel 330 and enhance transfer of combustion gas heat thereto.

The combustion gases must flow around each of the heat pipes, such as heat pipe 350, to enter the flow tubes, such as flow tube 332, provided through the vessel 330. The perforations in the radiating heat exchanger plate 310 and the alignment of the flow tubes, such as flow tube 332, cause the combustion gas mass to break up into sections, with each section losing heat individually thereby preventing adiabatic heat transfer which occurs when a mass of combustion gas is cooled in one area more than another area. The adiabatic heat transfer within the gases effectively lowers the heat density and makes heat transfer from the gases difficult. As the gases flow around the heat pipes (350) and through the tubes (332) they give up heat by conduction and infrared radiation to the walls of the vessel 330. Steam and carbon dioxide give up heat by infrared radiation, whereby the moisture in the input fuel and the steam injected into the char not only aid the combustion process, but also enhance the heat transfer by radiation.

Referring again to FIG. 4, as the combustion gases exit the flow tubes provided through the primary heat exchanger vessel 330, they strike the upper surface of the outer shell 160 and are directed down along the sidewall 285,287 of the central reactor 283. There, the gases encounter the condensing heat exchanger which is shown in detail in FIGS. 6 and 7. The heat exchanger medium, such as water, is carried to the vessel 330 by means of a plurality of vertical tubes, such as tube 410, which are positioned on opposite sides of the vessel 330 and arranged to oppose opposite faces of the sidewalls 285, 287 the control reactor 283. The vertical tubes connect at their lower end to manifolds, such as manifold 412. Input fluid is routed to the manifolds, such as manifold 412, by an input port, such as input port 414. Provided on opposite sides of the vertical tubes (410) are wire mesh screens, such as screens 416, 418. The combustion gases which exit through the upper surface of the primary heat exchanger vessel 330, are split into two steams 180° apart and down through the condensing heat exchanger 400.

Figure 8:
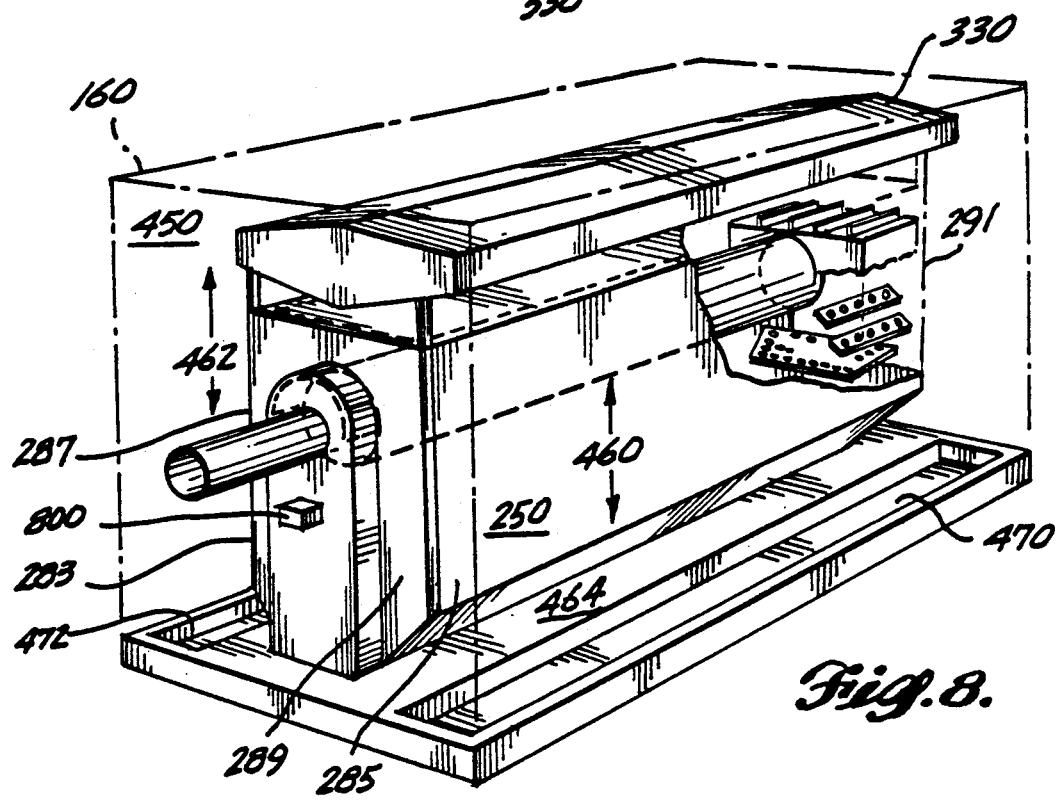
FIG. 8 is a perspective view of the fuel reactor and illustrates the condensate collector system, the gas dispersion plate, and the gas burner for start up.

The operation of the condensing heat exchanger is best understood with reference to the operation of the reheater chamber, best shown in FIGS. 4 and 8. The reheater chamber is the area formed between the central reactor angled wall at the base 283 and the outer shell 160. Shown generally at 464 and 289, the reheater chamber comprises a small area portion 464 beneath the reactor and the back wall of the reactor. Heat is conducted and radiated through the bottom angled walls and the back from the hot expansion chamber 250 to much cooler gases flowing in the reheater chambers 464 and 289.

FIG. 4 illustrates flow of the gases in the reheater chamber 450. As the exhaust gases flow over and through the wire mesh, such as meshes 416, 418, water is extracted by adhering to the wire and drains to one of two condensate collectors 470, 472 as shown in FIGS. 3 and 8. The gases flow along the side of the central reactor angled bottom wall 283 to the feeder end, then turn and flow up the back side of the reactor. The back wall is the second stage of the reheater, where the gases are reheated to approximately 350° F. (See arrow 490 in FIG. 4.) In this second stage, the two gas streams, such as the gas streams illustrated by arrows 492 and 494, ultimately combine into one stream and flow to the stack 500 which is provided in the top surface of the outer shell 160. The purpose of the reheater 450 is to heat the gases so that condensing cannot occur in the stack and to also produce a draft for the reactor.

The condensing chamber 450–460 FIG. 8 and reheater chamber 464 and 289 FIG. 8 serve, in combination, as a pressure trap, similar to a water drain trap on a sink. The cool heavy gases in the condensing heat exchanger 460 move downwardly, aided by gravity, and the reheated dry gases move upwardly with these two flows preventing atmospheric pressure from producing a flow to the low pressure area caused by gas contraction during cooling and condensing. As such, this trap system allows the cooling combustion gases to create a self-induced draft for the reactor.

The condensate is collected in the condensate collectors 470, 472.

In the preferred embodiment of the present invention, the condensate collected in condensate collectors 470, 472 is converted into a high temperature—high pressure steam and injected into the core 110 for enhanced combustion of the char.

Figure 9:
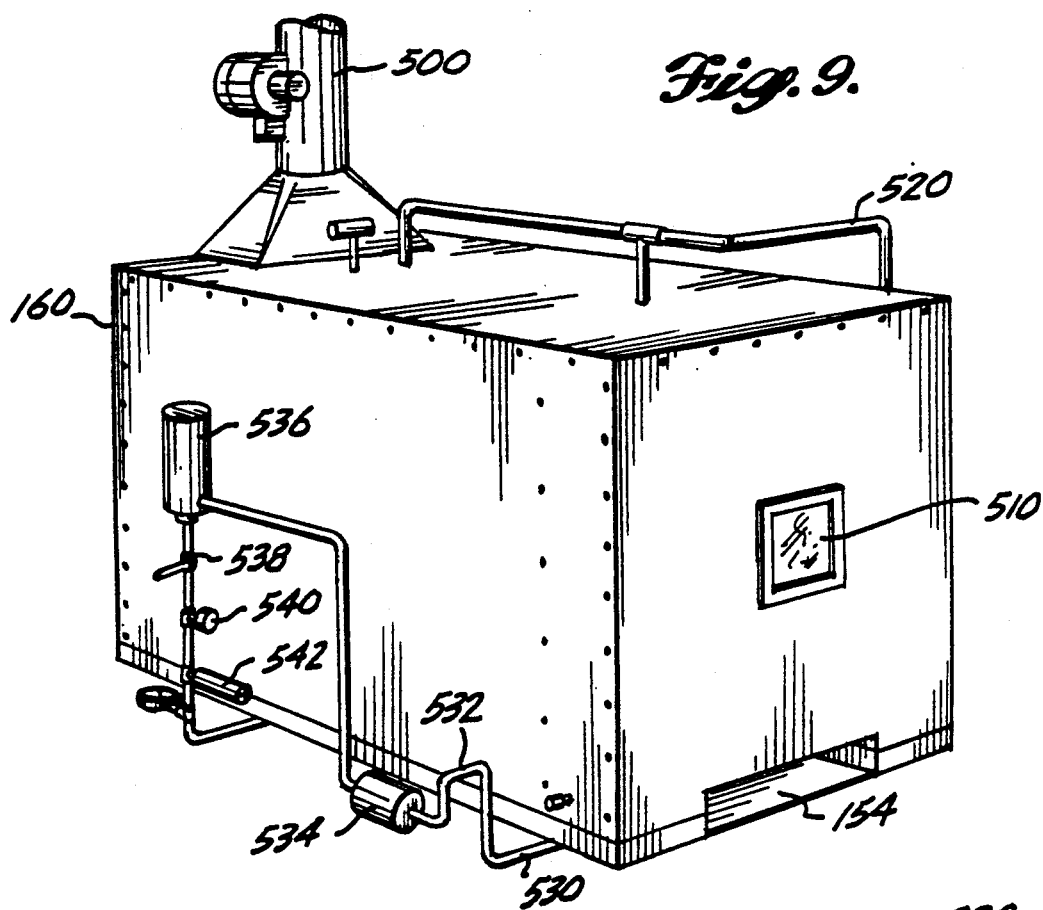
FIG. 9 is a perspective view of the back of the fuel reactor and illustrates the condensate reservoir, condensate drain pipe, the high temperature-high pressure steam pump, the fresh air input, the reactor viewing chamber, the stack and the hot water outlet pipe.

The condensate injector system is illustrated in FIGS. 3 and 9. FIG. 9 is a rear view of the reactor and also illustrates the air input port 154, a viewing window 510 with a view to the gas dispersion chamber and rear of the core 110, and a hot water output line 520 which extracts hot water from the fuel exchanger vessel 330.

Returning to the condensate injector, condensate is collected in collectors 470, 472 and extracted via an output line 530 which includes a 180° drain trap 532. The condensate then passes to a pump 534 where it is pumped up to a condensate reservoir 536. The flow rate from the reservoir into the injection system is controlled by a flow rate valve 538. Mounted below flow valve 538 is a check valve 540 which allows flow of the condensate from the reservoir 536 into the injector, but prevents reverse flow. The safety relief valve 542 relieves excess back pressure. The condensate then flows to the high temperature—high pressure steam pump 560 which is described in detail with respect to FIG. 10. As shown in FIG. 3, the steam pump 560 has an input, lower surface which is positioned in the cooler input air duct of the reactor and an upper surface, which includes the output port for high temperature high pressure steam, which is positioned in the hot gas expansion chamber 250. To facilitate filling the steam pump 560 with a condensate, an air purge line, terminating in escape valve 562, is included. Extremely high temperature high pressure steam which exits the steam pump 560 is routed via output tube 570 to the injector nozzle 132. To further heat the steam, a plurality of heat vanes such as heat vanes 572, are provided on the output tube 570.

The function of the injection system is to greatly increase the reactivity rate of the char such that the char can be consumed at the same rate as the solid fuel is devolatized. The injection system does this in two ways: by increasing the reacting surface area for the chemical reactions and through a chemical process. The mass transport limitations of char are overcome mechanically by physically breaking and eroding the char particles and by forcing diffusion of the super heated steam through the pyrolysis char. The steam chemically reacts with carbon creating hydrocarbons and carbon monoxide.

The high velocity injectors are operated by a cyclic steam pump (FIG. 10) through an adiabatic process in that the operating thermal energy is derived from the reactor and then returned to the reactor.

Figure 10:
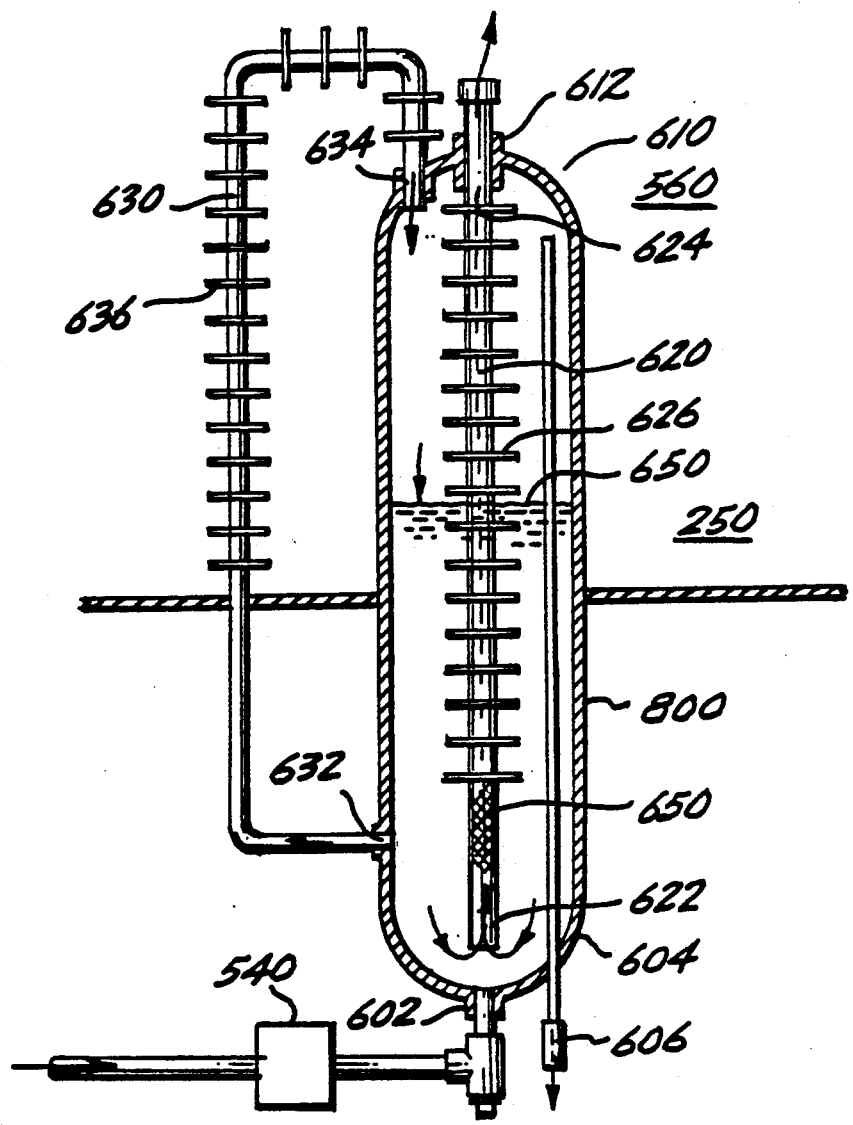
FIG. 10 is a detailed, cross-sectional view of the high temperature-high pressure steam pump.

Referring to FIG. 10, the novel steam pump 560 includes a fluid containing vessel 600. The fluid containing vessel has an inlet 602 at a first end 604. The inlet receives condensate, or other fluid by means of the check valve 540, which allows fluid flow into the vessel 600, but prevents reverse flow. Air can be vented from the vessel 600; to allow filling with fluid, via the air escape line 606 and valve 608.

Provided at the opposite, or second end 610 of the vessel 600 is an outlet 612 from which the high temperature high pressure steam is released. A heat pipe 620 is provided within the vessel 600. The heat pipe 620 is a tube having a first end 622 which projects down to the inlet 602 of the vessel 600. A second end 624 of heat pipe 620 connects to the outlet 612. The transfer of heat to the heat pipe 620 is enhanced by a plurality of heat fins such as heat fin 626. Operation of the heat pump is further enhanced by a second heat pump 630. The second heat pump 630 is positioned externally of the vessel 600 and has an inlet side 632 connected to the first end 604 of the vessel, and an outlet 634 which connects to the second end 610 of the vessel 600. A plurality of heat fins, such as heat fin 636, enhance transfer of heat flow to the second heat pipe 630.

The heat pump must be positioned such that its upper, second end 610 is heated. In the preferred embodiment of the fuel reactor, this is accomplished by positioning the second end 610 in the gas expansion chamber 250, whereas the first end 604 projects down into the air inlet duct.

Operation of the steam pump 560 is understood as follows. The injection cycle begins by the check valve 540 opening allowing the fluid or condensate to flow into and begin filling the vessel 600. When the level of the liquid reaches the second end 610 of the vessel, (this level being shown as line 650) steam is rapidly formed which stops and reverses flow of the liquid. The reverse flow causes the check valve to slam shut resulting in a hydraulic shock in the liquid. The shock causes liquid to splash over the hot section of the vessel 600, creating more steam. Steam pressure forces liquid into the first end 622 of the heat pipe and then up into the hot section of heat pipe 620. The result is yet more steam creation with steam being emitted from the outlet 612 at a high pressure and high temperature. Prior to entry of the liquid, the heat exchanger had been heated to the temperature of the gas expansion chamber 250 (i.e., 1800° F.) thereby causing the steam to be heated to approximately 1500° F. This process of converting the input liquid to output high pressure—high temperature steam is very fast resulting in the steam blasting into a char at an extremely high velocity. When the liquid volume in the vessel 600 is sufficiently reduced, steam generation ceases. The remaining liquid migrates up a wire mesh 650 provided in the first heat pipe 620, causing the liquid level to lower and the vessel to cool and steam to condense. As the liquid level is lowered and the vessel is cooled, a vacuum is created. This vacuum and the column height cause the check valve 540 to open and the cycle to repeat.

The rate of the steam pump can be controlled by the flow valve 538 (FIGS. 3 and 9).

Condensate is used as the injection medium instead of fresh water for the purpose of disposing of pollutants. When the combustion gases are cooled for condensing, the condensate serves as a natural scrubber system. The heavier constituents of the condensate settle to the bottom of the reservoirs 470, 472 and are drawn out for injection. The high velocity of the injection system allows fine ash and other solids to be processed without clogging the system. The hydrocarbons are decomposed and consumed.

The steam can be injected at numerous places in the reactor to thereby control temperatures and reactions. Besides injecting into the inner fuel tube, steam can be injected through porous char/gas dispersion shelfs, fogged into the gas tube or into the top of the char/gas chamber. The injector system can be used as the carrier and applicator for catalysts, for reactions or buffers for sulphur dioxide control or as an air pump.

Figure 11:
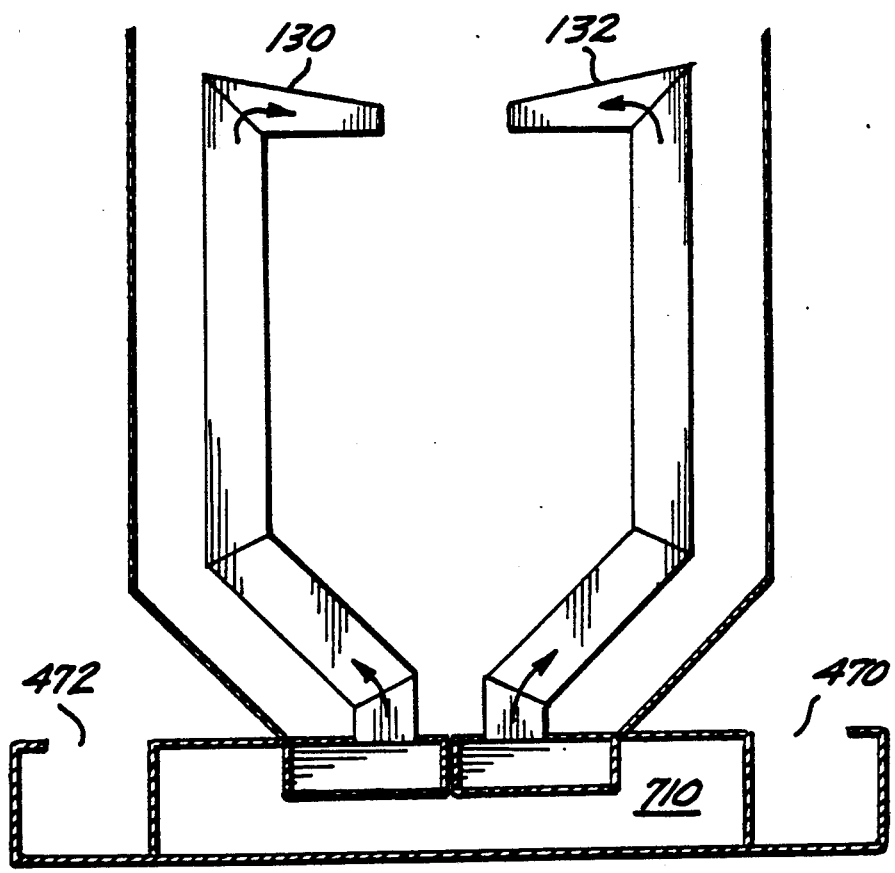
FIG. 11 is a cross-sectional view of the base of the reactor illustrating the air ducts to, and the relative positioning of, the air injection system.
Figure 12:
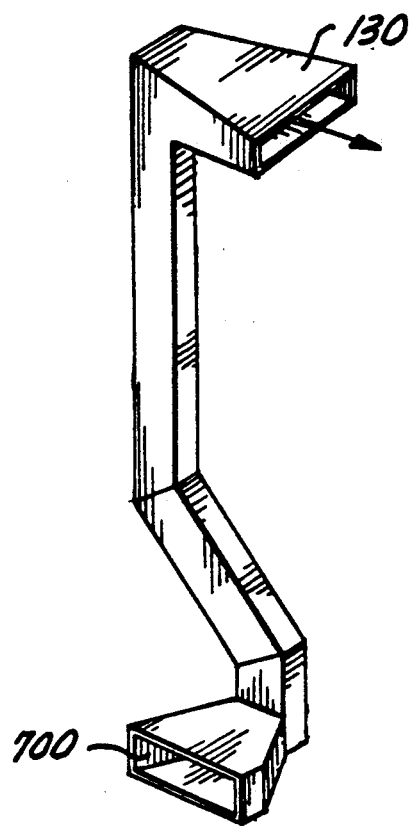
FIG. 12 is a perspective view of an air injection nozzle.

FIG. 11 is a cross-sectional detail illustrating the configuration of the injector nozzles 130, 132. As is shown in greater detail with respect to FIG. 12, injector nozzles have an input port 700 which are positioned in the fresh air duct 710 and positioned to receive input air. Also shown are the condensate reservoirs 470, 472.

Figure 13:
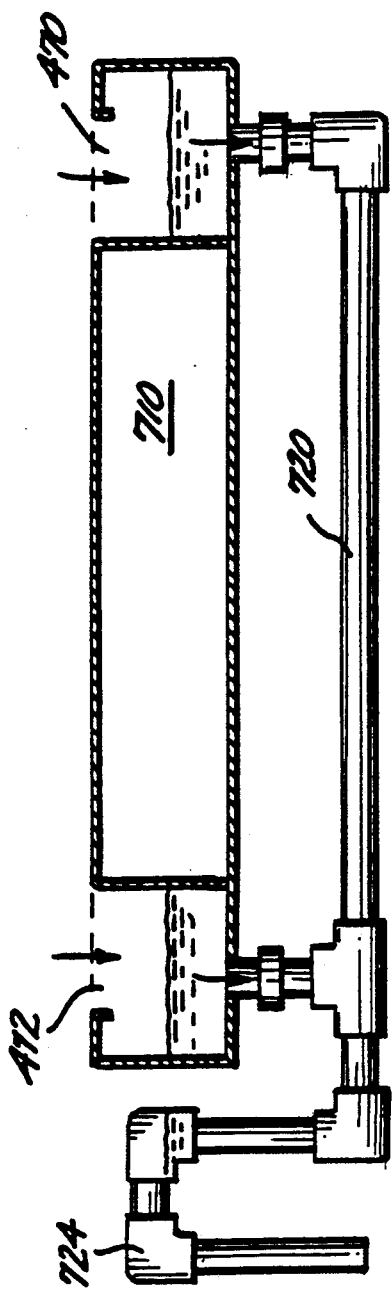
FIG. 13 is a cross-sectional view of the fresh air duct and condensate collector assembly.

FIG. 13 also illustrates the fresh air duct 710 which is flanked by the condensate collectors 470, 472. A line 720 interconnects the two reservoirs whereby the condensate output is provided in an output line 724. Line 724 serves as a pressure trap so air does not vent back into the system which would destroy the self-induced draft created by the primary heat exchange, condenser, and reheater.

Figure 14:
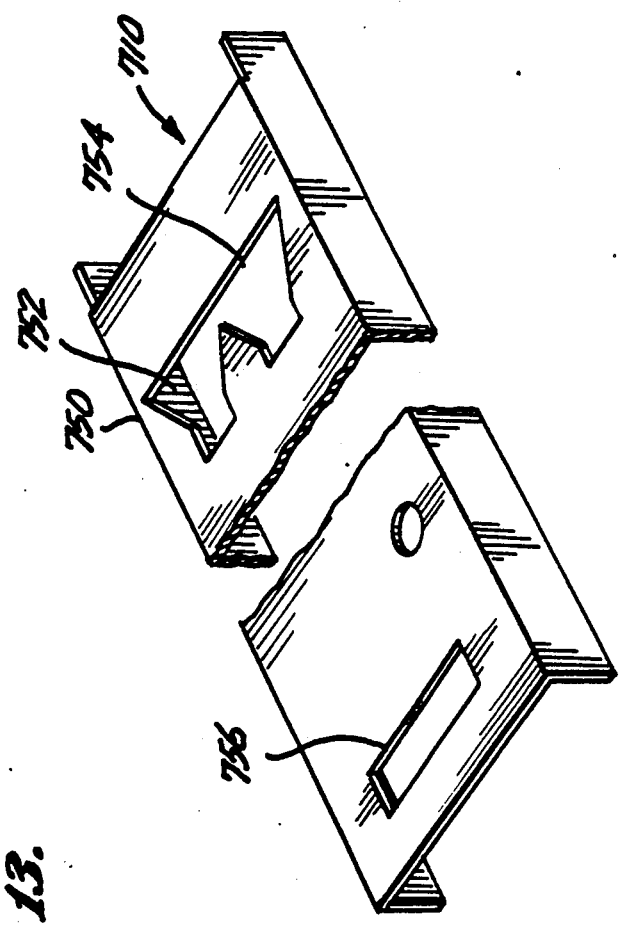
FIG. 14 is a perspective view of the fresh air duct.

FIG. 14 is a detailed drawing illustrating the bottom plate 750 which forms the fresh air duct 710. Note the cutouts 752 and 754 provided to route fresh air intermediate to the core and to the inputs ports 700 (FIG. 12) of the injection nozzles. Also shown is the cutout 76 which provides fresh air to the duct and support strut 162 (FIG. 3).

Figure 15:
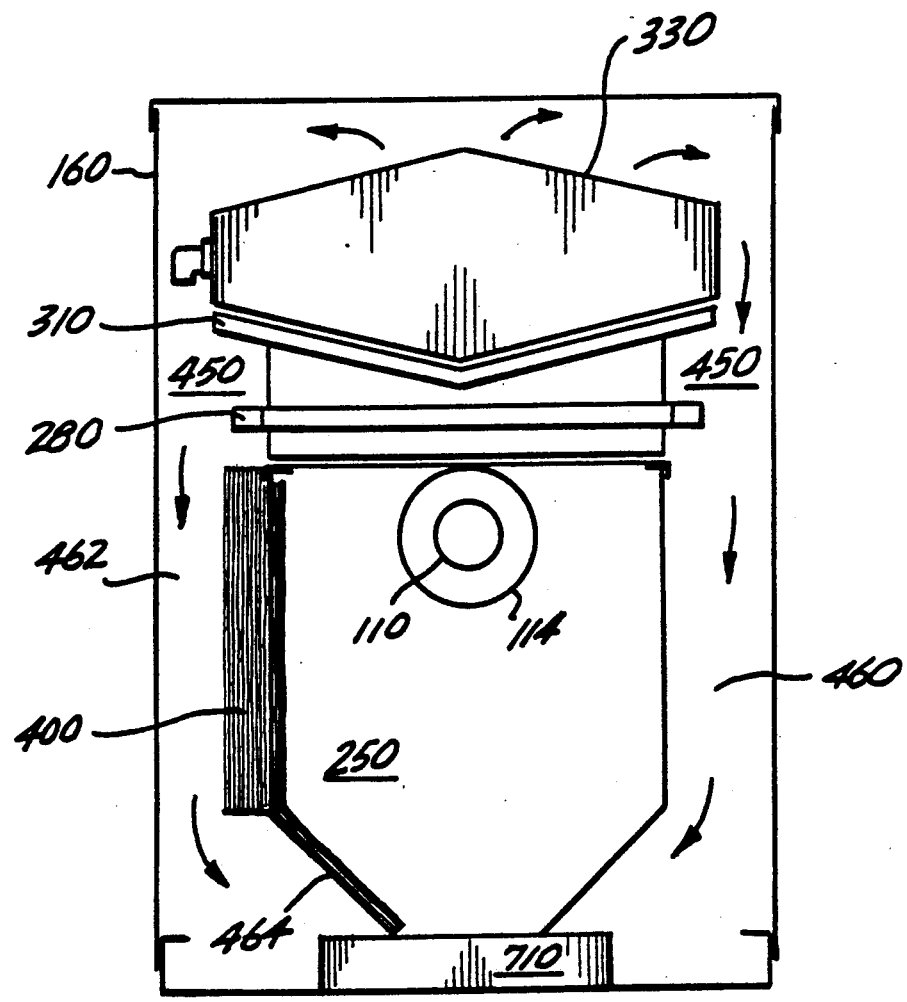
FIG. 15 is a cross-sectional cut through the reactor showing the relative placement of the core, primary heat exchanger and condensing heat exchanger.

FIG. 15 is a cross-sectional view through the fuel reactor and illustrates the fuel tube 110 and gas tube 114 contained within the central reactor 283 expansion chamber. Shown is the gas expansion chamber 250. Input air is provided to the system through fresh air duct 710. Hot combustion gases from the core passes through the gas dispersion shelf 280 and radiating heat exchanger plate 310 to the primary heat exchanger 330. The gas stream is split in two streams, each flowing 180° apart then flow down around the reactor through the condensing chamber 450 comprised of vertical chambers 460, 462 and bottom reheater section 464. In Passing down through the condensing chambers 460, 462 the combustion gases encounters the condensing heat exchanger 400.

The unique feature of the disclosed fuel reactor is that it allows combining all excess air with volatiles immediately as they are produced in stages, and then allows the char in the char/gas dispersion shelfs to consume the excess air. This permits using a large amount of excess air with the volatiles, but a low amount of excess air for the total system. The disclosed system allows close temperature control in different areas of the reactor using a minimum amount of air and at low flow velocities, which prevents nitrous oxide formation and particulates from being carried into the atmosphere.

The reactor outer shell 160 is preferably formed as an adiabatic wall (a perfect insulator and reflector of heat) and may be made of a vacuum formed ceramic. The fuel tube 112 and the gas tube 114 are preferably diathermic walls (a perfect conductor and emitter of heat). These may be formed of a ceramic or stainless steel. As thus constructed, the fuel reactor concentrate the energy to flow to the core where the cool fuel is and where the endothermic reactions occur.

Start up ignition of the fuel reactor may be accomplished via a liquid or gas burner (FIG. 8, item 800) which is mounted such that combustion gases flow through the gas tube and follow the same path as the combusted solid fuel gases. This burner can be used in conjunction with a solid fuel or used as a back up when solid fuel is not being used. After the solid fuel is ignited and the reactor is brought up to temperature, the ignitor 800 may be turned off.

The thermal energy for the operation of the reactor comes from the combustion of the products of the solid fuel. The combustion gases of the volatiles and char combine in the expansion chamber to provide an atmosphere of approximately 1800° F. for the core 110 and 112. Thermal energy is transferred toward the core 110 to the gases and solid fuel. The gas tube wall 114 provides a constant heat source where the endothermic reactions and radical initiation occurring in the tube.

As the solid fuel is devolatized, the lighter fractions enter the gas tube 114 and are combusted, providing a hot gas stream for the heavier fractions to combine with. The heat from the volatiles is immediately available for both solid fuel and gas pyrolysis. As a solid fuel moves down the inner tube, char particles are grated and enter the gas stream, where they are oxidized, providing more thermal energy. Char is oxidized in the last section in the fuel tube 112, creating a 1800° F. temperature zone. All the gases must flow between the two 1800° F. surfaces as they exit the gas tube 114 and enter the char/gas chamber 180. The temperature here is maintained above 1800° F. by the char oxidizing on the char/gas dispersion shelves. The final reaction occur in the expansion chamber 250 where the gases begin the cooling process.

In summary, a high efficiency, low pollutant producing fuel reactor has been described in detail. Also described is an advanced heat exchanger system and a high temperature-high pressure producing steam pump. Also creation of a self-induced draft and a combustion gas scrubber.

While the preferred embodiment of the invention has been described in detail, it should be apparent that many modifications and variations thereto are possible, all of which fall within the true spirit and scope of the invention.

Finally, FIG. 16 is a perspective view of an alternate embodiment of the fuel reactor. Here, the gas tube 114 is cut back from the input port 116 end to expose the fuel tube 112 directly to hot combustion gases in the expansion chamber. In so doing, heat transfer to solid fuels is enhanced. A corresponding change is made to the fresh air duct 162a, angling it back to meet with the forward end of the gas tube 114.

I claim:

1. A heat exchanger for extracting heat from a combustion gas producing core comprising:
    a gas dispersion shelf positioned above said core acting to distribute the combustion gas at a substantially constant density and providing a thermal barrier above the core for maintaining core temperature;
    a radiating heat exchanger plate positioned above said gas dispersion shelf for extracting heat therefrom;
    said gas dispersion shelf and said radiating heat exchanger plate being provided with flow holes with said heat exchanger plate positioned with respect to said gas dispersion shelf such that the combustion gas flows through said gas dispersion shelf holes, impinges on the lower surface of said radiating heat exchanger plate and moves laterally there across to the holes therein; and
    a primary heat exchanger comprising a vessel for containing the heat exchanger medium, said vessel being positioned above said radiating heat exchanger plate and including gas flow tubes extending through said vessel to allow combustion gas flow there through to thereby enhance the transfer of heat from said combustion gas to said vessel and heat exchanger medium.

2. The heat exchanger of claim 1 wherein said vessel has a generally diamond-shaped cross-section.

3. The heat exchanger of claim 1 wherein said primary heat exchanger further includes at least one heat pipe positioned between said vessel and said radiating heat exchanger plate such that combustion gases which pass through the holes in said plate flow around said heat pipe carrying the heat exchanger medium from at least two locations on said vessel to produce a flow in said heat pipe and thereby further enhance the transfer of heat from the combustion gas to said primary heat exchanger.

4. The heat exchanger of any of claims 1 through 3 further comprising:
    a condensing heat exchanger including a plurality of vertical pipes joined to a manifold for providing the input exchanger medium to said vessel, said vertical pipes being positioned opposite vertical faces of said core.

5. The heat exchanger of claim 4 further comprising:
    a housing for enclosing said core and said heat exchanger and forming a condensing chamber, said condensing chamber formed such that combustion gases which emerge from the top of the primary heat exchanger are routed around the core, past said condensing heat exchanger to the reheater chambers and up to a stack provided in the upper surface of said housing.

6. The heat exchanger of claim 5 wherein the condensing heat exchanger includes a wire mesh wall for extracting condensing fluid from the combustion gases and draining the condensate to a drain.

7. A heat exchanger for extracting heat from a central heat source and creating a self-induced draft, comprising:
    a primary heat exchanger positioned above said heat source and extracting heat from hot gases flowing therefrom;
    a condensing chamber positioned vertically downward from said primary heat exchanger and along a side of the heat source for extracting heat from, and condensing vapor in said hot gases;
    a reheater chamber positioned around the underside of the heat source to reheat the hot gases cooled by the condensing chamber;
    a stack for venting the heated gases from the reheater chamber; and
    an enclosure for said heat exchanger for directing gas flow from the primary heat exchanger down past the condensing chamber, into the reheater chamber and out the stack.

* * * * *